April 6, 1954     R. BRYANT     2,674,076
COTTON PICKER
Filed April 29, 1953     4 Sheets-Sheet 1
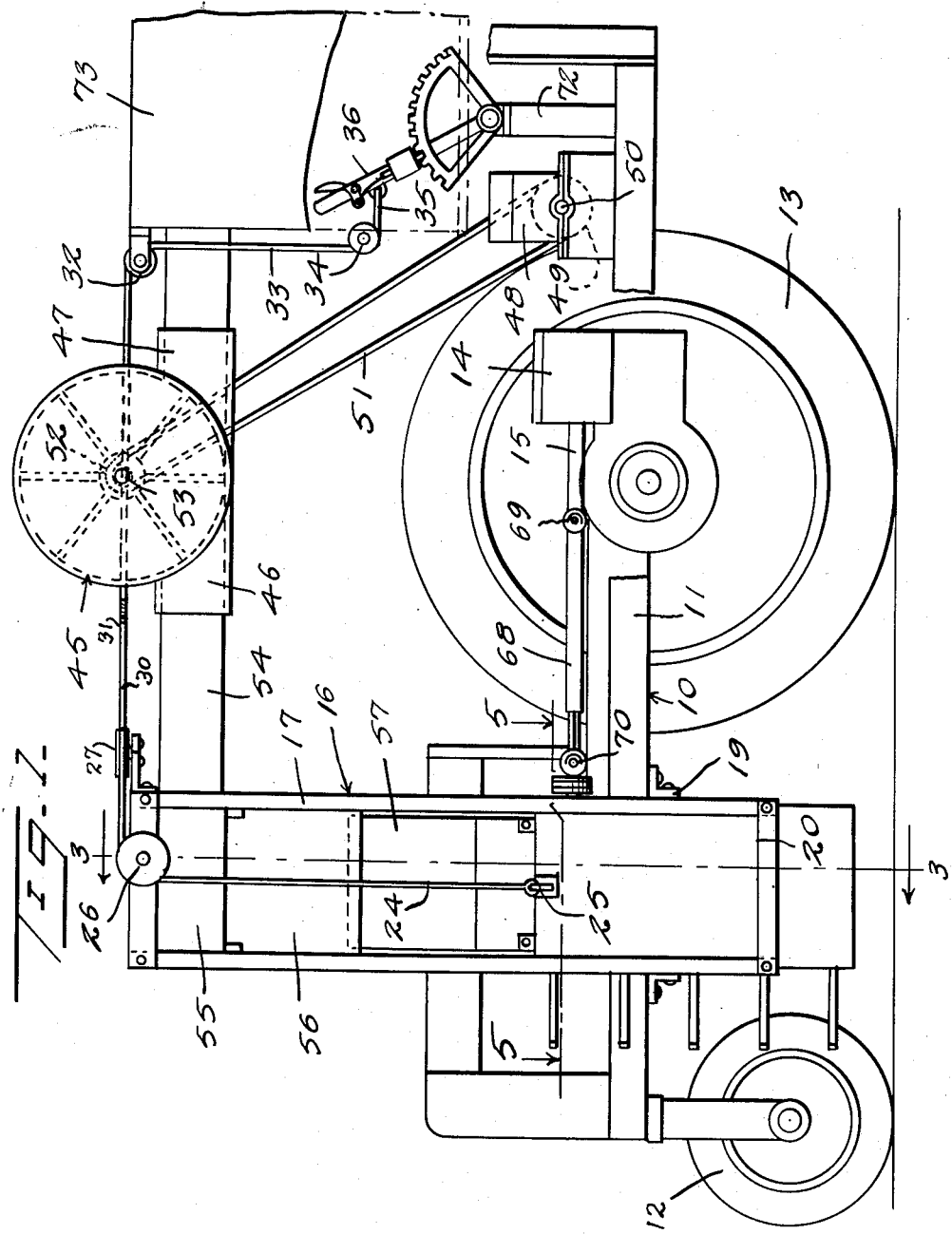
INVENTOR
Richard Bryant
BY *Kimmel & Crowell*
ATTORNEYS

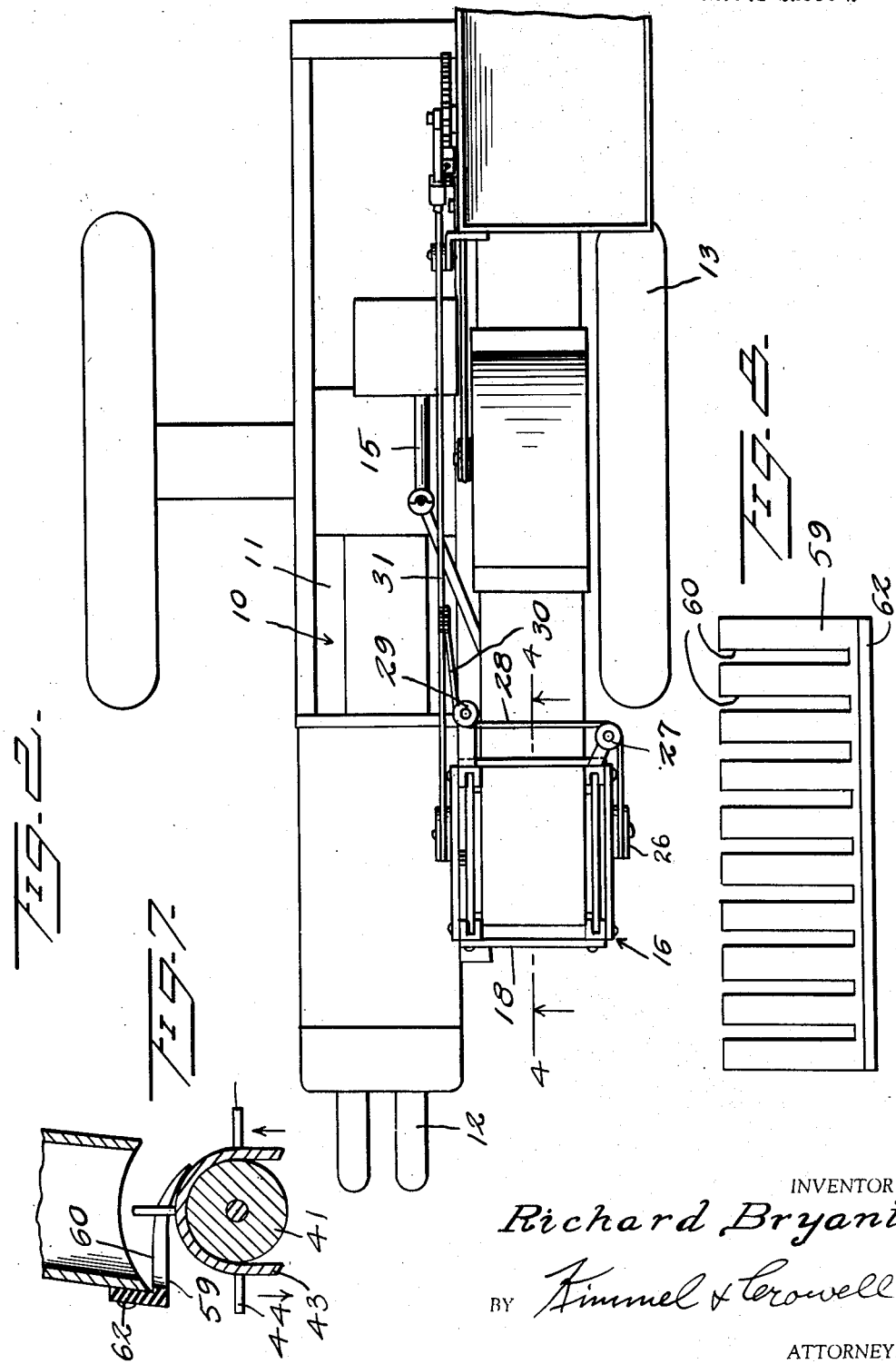

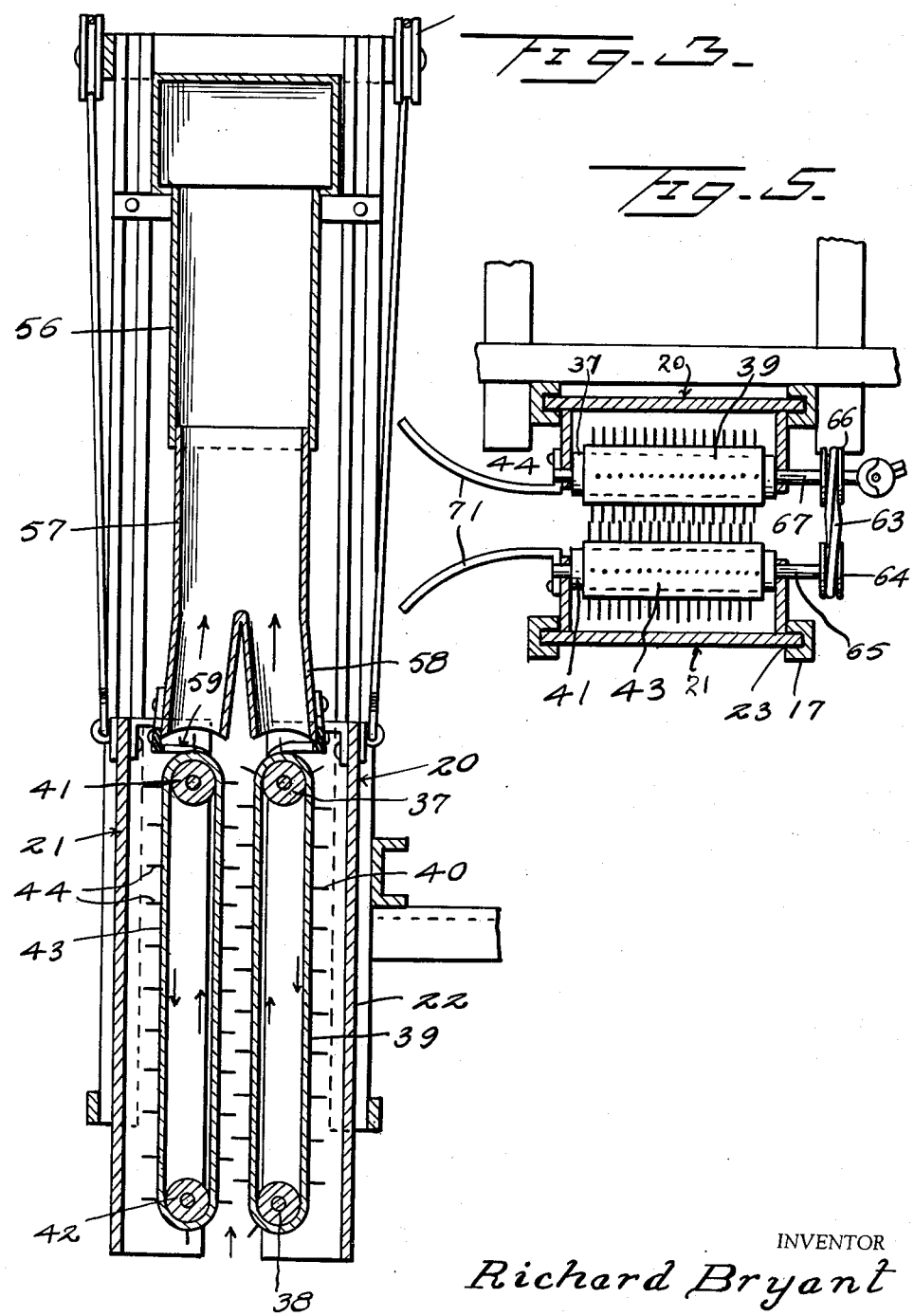

April 6, 1954
R. BRYANT
2,674,076
COTTON PICKER
Filed April 29, 1953
4 Sheets-Sheet 4
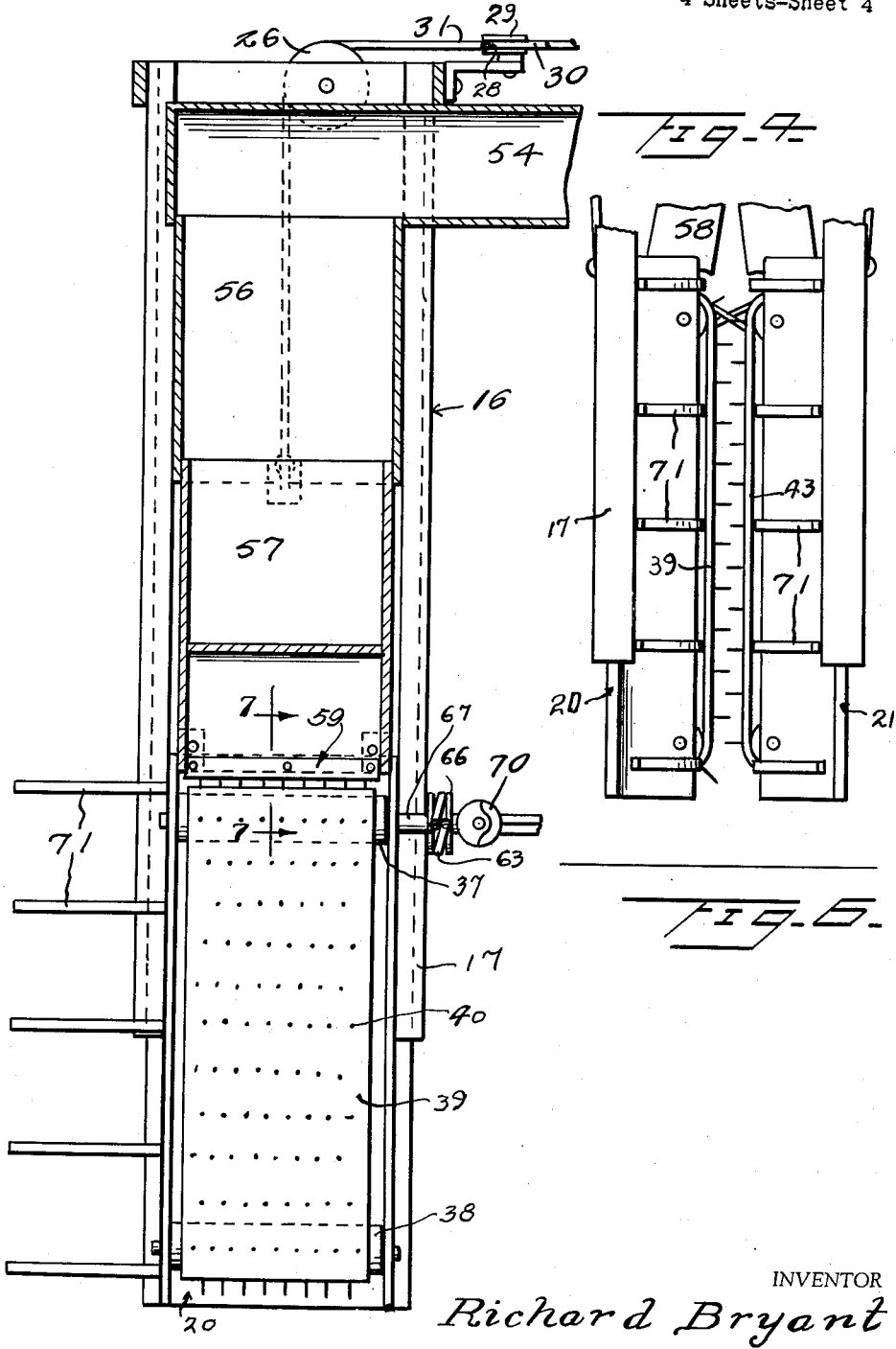
INVENTOR
Richard Bryant
BY Kimmel & Crowell
ATTORNEYS Patented Apr. 6, 1954

2,674,076

UNITED STATES PATENT OFFICE 2,674,076

COTTON PICKER

Richard Bryant, Lower Peach Tree, Ala.

Application April 29, 1953, Serial No. 351,816

2 Claims. (Cl. 56—14)

This invention relates to cotton pickers.

An object of this invention is to provide a cotton picker in the form of apparatus which may be attached to a tractor for operation from the power take-off of the tractor.

Another object of this invention is to provide a cotton picker wherein the cotton is picked from the plants by means of a pair of belts having picking pins or fingers. The cotton bolls are removed from the pins or fingers by strippers and the cotton is then sucked upwardly and rearwardly by a suction fan and deposited into a receiver or collector.

A further object of this invention is to provide a cotton picker attachment for a tractor which can be readily adjusted to engage plants of different heights.

With the above and other objects in view, my invention consists in the arrangement, combination and details of construction disclosed in the drawings and specification, and then more particularly pointed out in the appended claims.

Figure 1 is a detailed side elevation partly broken away of a cotton picker attachment constructed according to an embodiment of this invention;

Figure 2 is a plan view, partly broken away, of the device in applied position on a tractor;

Figure 3 is an enlarged vertical section taken on the line 3—3 of Figure 1;

Figure 4 is an enlarged fragmentary sectional view taken on the line 4—4 of Figure 2;

Figure 5 is an enlarged sectional view taken on the line 5—5 of Figure 1;

Figure 6 is a fragmentary front elevation of the picking structure;

Figure 7 is a fragmentary sectional view taken substantially along the line 7—7 of Figure 4, as viewed in the direction indicated by the arrows showing the stripper at the upper end of each picker belt; and Figure 8 is a plan view of one of the strippers.

Referring to the drawings, the numeral 10 designates generally a conventional tractor embodying a frame 11 and front and rear wheels 12 and 13 respectively.

The tractor 10 also includes a power take-off 14 from which a shaft 15 projects forwardly. An upright frame structure generally indicated at 16 is secured to the tractor frame 11 in a position to occupy the space between the front and rear wheels. The frame 16 includes pairs of confronting channel members 17 which are connected together by connecting bars 18.

The frame 16 is secured to the frame 11 by means of angle supporting bars 19. The frame 16 has adjustably mounted therein a pair of picker units 20 and 21. These units 20 and 21 are of like construction and each includes a vertically disposed housing 22 which opens inwardly and is provided at the opposite vertical edges thereof with slide flanges 23 engaging in the guides or channels 17. The units 20 and 21 are adapted to be vertically adjusted by means of a flexible cable 24 which is secured as at 25 to a picker housing and is trained over an upper pulley 26 which is rotatably carried by the frame 16.

There are two of these cables 24, one for each of the housings 20 and 21 and at least one of these cables is trained about a pulley 27 carried by the upper portion of the frame 16 so that the cable 24 may be extended right angularly and inwardly as indicated at 28. The extension 28 is then trained about another pulley 29 and the cable extended as indicated at 30 to the common cable 31. The cable 31 is extended rearwardly and is trained over an upper rear pulley 32 and extended downwardly from pulley 32 as indicated at 33.

The cable extension 33 is then trained about a rear lower pulley 34 and cable extension 33 is then extended rearwardly as indicated at 35 and is connected to an adjusting lever 36. Unit 20 has disposed therein upper and lower conveyor or picker drums 37 and 38 respectively about which an endless belt 39 engages and the belt 39 has projecting from the outer side thereof a plurality of staggered cotton picker pins 40. The unit 21 also has mounted therein upper and lower drums 41 and 42 about which an endless picker belt 43 engages and belt 43 also has fixed thereto a plurality of picker pins 44. The inner runs of the belts 39 and 43 move upwardly so as to move the cotton upwardly as the cotton is picked by the pins 40 and 44 from the plants. A suction blower 45 of any desired conventional type including a housing or casing and blades rotatably mounted on a shaft in said housing is mounted in any convenient manner above the tractor 10 and has the suction side 46 thereof extending forwardly with the blower side 47 extending rearwardly.

In certain instances where the power take-off 14 includes a second shaft extending laterally, the blower 45 may be connected with this second take-off. However, in order to be assured of the blower operating at a sufficiently high speed, I have provided a power member 48 which is secured to the rear portion of the tractor 10.

The power member 48 has a driving pulley 49 secured to the drive shaft 50 and an endless belt 51 is trained about the pulley 49 and about an upper driven pulley 52 which is secured to the fan or blower shaft 53. An upper pipe 54 extends from the suction side 46 and is connected with a suction housing 55 mounted in the upper portion of the frame 16.

The suction housing 55 includes a downwardly extending pipe 56 with a telescoping pipe section 57 projecting downwardly therefrom. The telescoping pipe section 57 is provided with a pair of downwardly divergent branches 58 which extend in the direction of and over the upper ends of the picker belts 39 and 43. The lower ends of the divergent branches 58 are disposed in upwardly spaced relation to the picker belts and each branch 58 has secured thereto a stripper member generally indicated at 59. The stripper member 59 is constructed in the form of an elongated hard rubber strip 60, which is provided with a plurality of slots 61 through which the pins 40 and 44 are adapted to engage. The strip 60 is formed at its outer edge with an upwardly projecting flange 62 which is secured to the outer side of a suction branch 58. The stripper member 59 is provided with a relatively thin inner edge and is transversely curved, particularly at its inner portion so as to snugly engage the picker belt as the belt passes over an upper drum.

The upper drums 37 and 47 are operatively connected together by means of a twisted belt 63 which engages about a pulley 64 fixed on the shaft 65 which extends through the drum 37. The belt 63 also engages about a pulley 66 mounted on a shaft 67 which is fixed to and extends through the upper drum 41. Shaft 67 is connected with the take-off shaft 15 by means of an intermediate extensible shaft 68 which has universal joints 69 and 70 at each end thereof. The cotton plants are led into the space between the picker belts 39 and 43 by means of a plurality of outwardly divergent or curved fingers 71 which are secured to the forward sides of the picker housings 20 and 21.

In use and operation of this attachment the frame 16 is secured by the supporting bars 19 to the tractor frame 10 and the picker unit adjusting lever 36 is secured to a suitable support such as 72 which is fixed to the rear portion of the frame 10. The picker housings 20 and 21 are adjusted vertically according to the heighth of the cotton bolls and the tractor is moved along the row of plants which will engage between the front wheels and one of the rear wheels. It will be understood that there may be two of these picking attachments, one on each side of the frame 10 so that two rows may be picked at one time. The pins or fingers 40 and 44 will pull the cotton bolls off of the plants and the cotton will move upwardly between the picker members 20 and 21. The strippers 59 will remove the cotton from the pins 40 and 44 and the cotton will then be drawn upwardly by the suction of the fan member or suction blower 45. The cotton which is discharged from the discharge nipple 47 is then moved rearwardly into a receiver or hopper 73 which is mounted on the rear portion of the tractor.

I claim:

1. A cotton picker attachment for a tractor having a power take-off comprising an upright frame structure, said frame structure comprising pairs of confronting channel members, means securing said frame structure to the frame of the tractor, a pair of picker members slidably engaging said channel members, means vertically adjusting said picker members, each picker member including a vertical housing, an endless belt in each housing, staggered picker pins carried by each belt, said belts having vertical inner runs, a driving connection between said belts, operating means for said belts connected with the power take-off, a suction means having an intake and an outlet carried by said frame structure and overlying said belts, and a collector connected with the outlet side of said suction means.

2. A cotton picker attachment for a tractor having a power take-off comprising an upright frame structure, said frame structure comprising pairs of confronting channel members, means securing said frame structure to the frame of the tractor, a pair of picker members slidably engaging said channel members, means vertically adjusting said picker members, forwardly projecting and outwardly curved plant guide fingers for guiding the plants between said picker members, each picker member including a vertical housing, an endless belt in each housing, staggered picker pins carried by each belt, said belts having vertical inner runs, a driving connection between said belts, operating means for said belts connected with the power take-off, a suction means having an intake and an outlet carried by said frame structure and overlying said belts, and a collector connected with the outlet side of said suction means.

References Cited in the file of this patent

UNITED STATES PATENTS

| Number | Name | Date |
| --- | --- | --- |
| 1,589,340 | Rodgers | June 15, 1926 |
| 1,664,924 | Helton | Apr. 3, 1928 |
| 1,778,587 | Crumley | Oct. 14, 1930 |
| 2,438,393 | Hammer et al. | Mar. 23, 1948 |